(12) United States Patent
Moore et al.

(10) Patent No.: US 7,257,836 B1
(45) Date of Patent: Aug. 14, 2007

(54) SECURITY LINK MANAGEMENT IN DYNAMIC NETWORKS

(75) Inventors: Timothy M. Moore, Bellevue, WA (US); Arun Ayyagari, Seattle, WA (US); Sachin C. Sheth, Redmond, WA (US); Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 09/694,514

(22) Filed: Oct. 23, 2000

Related U.S. Application Data

(63) Continuation-in-part of application No. 09/557,945, filed on Apr. 24, 2000, now abandoned.

(51) Int. Cl.
*G06F 7/04* (2006.01)
*G06F 15/16* (2006.01)
*H04K 1/00* (2006.01)
*H04L 9/00* (2006.01)

(52) U.S. Cl. ............... 726/5; 713/182; 713/185; 713/166; 713/175; 726/19

(58) Field of Classification Search ........ 713/155, 713/156, 157, 175, 182, 166, 185; 726/5; 726/19

See application file for complete search history.

(56) References Cited

U.S. PATENT DOCUMENTS 5,369,702 A * 11/1994 Shanton ............... 713/166
5,371,794 A * 12/1994 Diffie et al. ............ 713/156
5,991,877 A * 11/1999 Luckenbaugh ............. 726/1
5,999,711 A   12/1999 Misra et al.
6,049,877 A    4/2000 White
6,233,577 B1 *  5/2001 Ramasubramani et al. .... 707/9
6,571,221 B1 *  5/2003 Stewart et al. ............ 705/52
6,643,774 B1 * 11/2003 McGarvey ............. 713/155

FOREIGN PATENT DOCUMENTS

| GB | 2337908 A | 12/1999 |
|---|---|---|
| WO | WO99/65207 | 12/1999 |
| WO | WO 99/66384 | 12/1999 |

OTHER PUBLICATIONS

*Specification of the Bluetooth System*, v. 1.0B, Dec. 1, 1999.

(Continued)

*Primary Examiner*—Kambiz Zand
*Assistant Examiner*—Christopher J. Brown

(57) ABSTRACT

A method for setting up and managing secure data/audio/video links with secure key exchanges, authentication and authorization is described. An embodiment of the invention enables establishment of a secure link with limited privileges using the machine identifier of a trusted machine. This is particularly useful if the user of the machine does not have a user identifying information suitable for authentication. Furthermore, the presentation of a default user identifying information by a user advantageously initiates intervention by a system administrator instead of a blanket denial. This decentralized procedure allows new users access to the network without having to physically access a centralized facility to present their credentials. Another embodiment of the invention enables a remote user to connect to a secure network with limited privileges.

12 Claims, 10 Drawing Sheets

OTHER PUBLICATIONS

Riku Mettala et al., *Bluetooth Protocol Architecture* (White Paper), v 1.0, Nokia Mobile Phones, Sep. 29, 1999.

Brent Miller et al., *Mapping Salutation Architecture APIs to Bluetooth Service Discovery Layer* (White Paper), v. 1.0, IBM Corporation, Jul. 1, 1999.

IEEE Standard, 802.11, *Part 11: Wireless LAN Medium Access Control (MAC) and Physical Layer (PHY) Specifications*, 1st Ed. 1999, and Supplements 802.11a-1999 and 802.11b-1999.

Bob O'Hara and Al Petrick, *IEEE 802.11 Handbook A Designer's Companion*, Dec. 1999.

C. Rigney et al., RFC 2865, "Remote Authentication Dial in User Service (Radius)", The Internet Society, Jun. 2000.

B. Aboda and D. Simon, RFC 2716, "PPP EAP TLS Authentication Protocol", The Internet Society, Oct. 1999.

L. Blunk and J. Vollenbrecht, RFC 2284, PPP Extensible Authentication Protocol (EAP), The Internet Society, Mar. 1998.

IEEE 802.11 *Security White paper*, v0.1, Windows Network Infrastructure team, Microsoft Corporation, Mar. 15, 2000.

T. Muller, *Bluetooth Security Architecture* (White Paper), v. 1.0, Jul. 15, 1999.

IEEE 802.1X *Supported Scenarios*, Windows Network Infrastructure team, Microsoft Corporation, v0.1, Apr. 7, 2000.

Draft Standard for Local and Metropolitan Area Networks-Port-Based Network Acess Control (Revision). Copyright 2004 by the Institute of Electrical and Electronics Engineers, Inc.; 3 Park Avenue, New York, NY 10016-5997, USA (pp. 1-175).

IMB Technical Disclosure Bulleting; Warp Server (SMB) Authentication from a Windows NT Client; vol. 40 No. 10 Oct. 1997, IMB Corp.

European Search Report; EP 04 02 5103; The Hague; Nov. 10, 2004.

Europeon Search Report; EP 04 02 5104; The Hague; Nov. 18, 2004.

S. Garfinkel et al., "Practical Unix and Internet Security", 1996, O'Reilly and Associates, USA, pp. 487-494.

* cited by examiner

SECURITY LINK MANAGEMENT IN DYNAMIC NETWORKS

CROSS REFERENCE TO RELATED APPLICATIONS

This is a continuation-in-part of a non-provisional patent application Ser. No. 09/557,945 filed Apr. 24, 2000 now abandoned for "Bluetooth Security Connection Management", which is commonly assigned herewith to Microsoft Corporation. The above aforementioned patent application is incorporated hereinto in its entirety by reference.

TECHNICAL FIELD

This invention relates generally to facilitating video/audio and data links in dynamic networking and computing environments and, more particularly, relates to setting up and managing links with encryption and security features in such environments.

BACKGROUND OF THE INVENTION

The phenomenal growth of network-based electronic commerce has resulted in a multitude of new applications, including hosting, conducting and managing remote links and networks. These applications permit users to interact with each other in the course of transacting business or tracking information of interest using secure links.

Secure links or connections for obtaining secure access to a computing resource typically involve one or more of three concerns—authentication, authorization and accounting ("AAA"). The term secure, consequently, includes the ability to authenticate a party and/or encrypt communications to prevent eavesdropping by unintended recipients or third parties. A secure network is formed by communications over secure links. However it should be understood that there are various levels of authentication and encryption that are available and are intended to be within the scope of the invention. A plain text communication without authentication is an insecure communication although the context dictates the threshold to be used when deciding whether a communication is secure.

In a commercial context it is important to authenticate a user, then authorize access to resources for the authenticated user and to account for the use of such resources. The "roaming user" made possible by mobile computing, and in particular wireless links, makes the AAA task increasingly challenging. In this context security protocols need to accommodate wireless links and decentralized operations. Significant latency may be encountered in a network access to a Personal Area Network (PAN), Local Area Network (LAN) or Wide Area Network (WAN). However, the intrinsically transient nature of interactions with mobile computing units requires low latency connections to provide an acceptable computing experience to users. In particular, users should be able to rapidly establish connections on secure links regardless of whether the access point exists within an intranet or on an externally located dynamically established link. Novice users or new employees should be able to obtain at least limited privileges to use a secure network. Many problems, such as those outlined above remain in implementing secure links that utilize advanced network access control and encryption/authentication schemes or flexible conference topologies. These problems present new challenges in the area of network server systems supporting wireless networking.

SUMMARY OF THE INVENTION

The invention described herein addresses these problems and facilitates creating a computer network for establishing dynamic secure links between a client and a server device in the course of establishing secure connections over a wider range of network links. In particular client side protocols are described to enable exchanging information to establish a secure connection. Furthermore, methods and systems incorporating the present invention establish a key exchange protocol in a wireless connected computing environment. The key exchange is accomplished through judicious choices of an extensible authentication protocol (EAP) and transport level security (TLS).

A method for setting up and managing secure data/audio/video connections with secure key exchanges, authentication and authorization is set forth herein. The method includes implementing TLS within the EAP. An embodiment of the invention allows a machine to establish secure connections with limited privileges if a user of the machine does not provide satisfactory user identifying information. This method permits flexible management of a network comprising machines and network links that differ in their security capabilities and susceptibilities. Furthermore, a user's failure to present user identifying authenticating information initiates a machine logon process, thus relaxing requirements associated with a typical logon process and providing a basic level of access when appropriate.

An embodiment of the invention allows a user connected to a secure network via an insecure link only limited access to the secure network following authentication. A user logged on via an insecure link is granted a more limited set of privileges than the same user receives when logged on via a secure link.

In an embodiment of the invention, a machine establishes a secure link without a user logging on. Consequently, mission critical servers are able to stay on the network without the need for a user to be logged on as well. And a user logon does not disrupt the security access of the machine.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
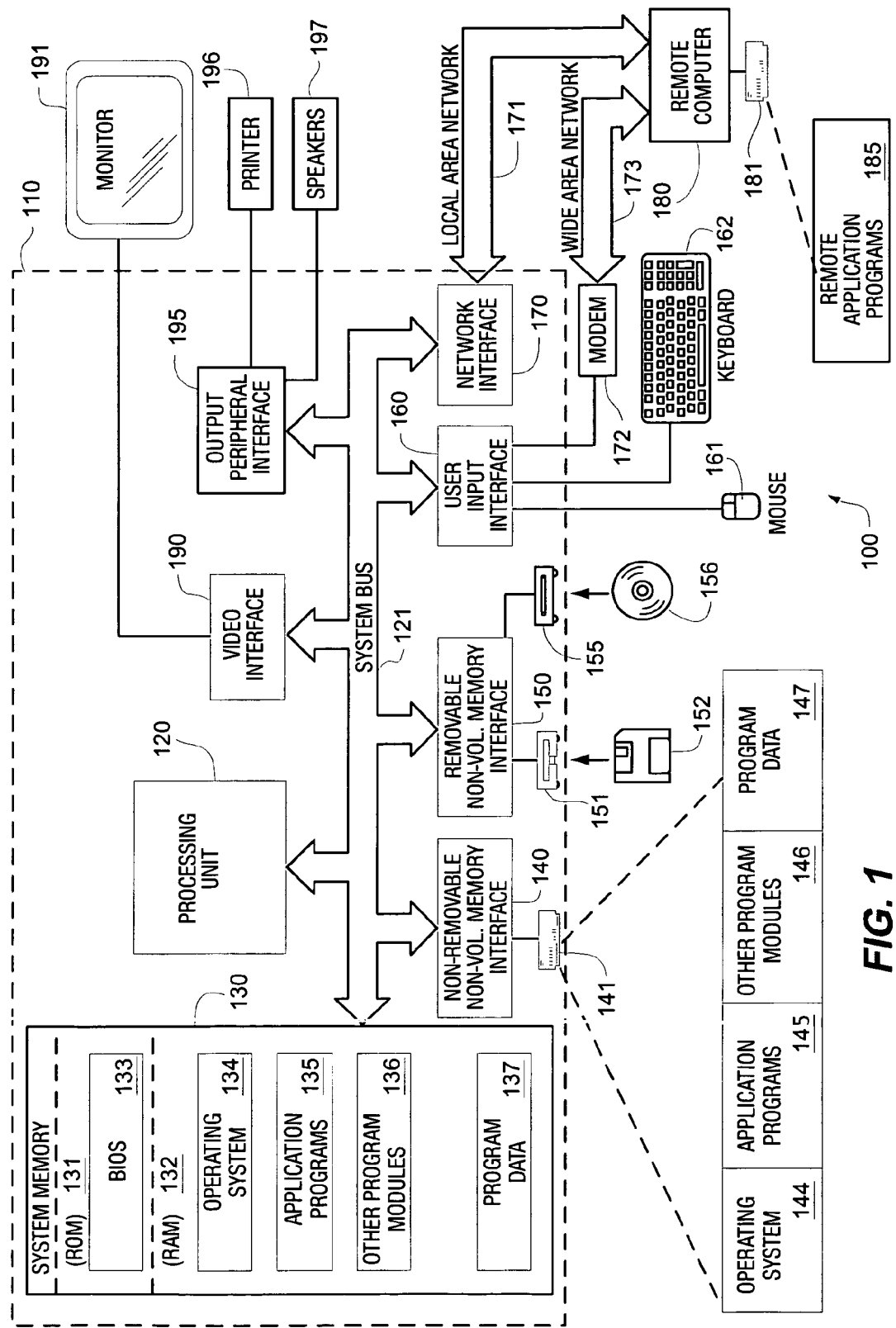
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired networks and wireless media such as acoustic, RF, and infrared and optical media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical links to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical links depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network links shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In an authentication/encryption scheme, the first hurdle to be overcome for establishing network access or connectivity is authenticating one or more parties using the link. This is usually accomplished by means of a certificate issued by a trusted source. In the context of a secure conference a party seeking to join the secure conference has to prove its claimed identity. In some embodiments a conference-node may be required to prove its identity. A certificate contains information about a party presenting the certificate and includes security measures so that any alterations, including those by the party presenting the information, can be detected.

The basic procedure may be understood by considering the asymmetric key encryption scheme. In this scheme two keys are used in the encryption/decryption procedure, conveniently termed the public key and the private key. The private key is held securely, e.g., stored in a safe location in the memory of a computer or on a smart card. The public key is given out freely. The public and private keys are mathematically related, but are not easily computed from each other. In particular, knowledge of the public key does not allow computation of the private key in a reasonable interval of time. Furthermore, a message encrypted with one of the keys can only be decrypted with the other key.

A user needing to authenticate its identity requests a trusted certificate authority (CA) to issue a certificate about its identity. This request is preferably coded with the CA's public key. There are many ways to achieve this goal including, for instance, first encrypting the claimed identity with the user's private key and then encrypting the message along with a copy of the potentially new user's public key using the CA's public key. This ensures that the CA will know which public key to use for further decryption once it decrypts the message with its own private key. Furthermore, successful decryption of the message assures the CA that the message originated with the user since it had to be encoded by the user's private key to permit decryption by the user's public key. Thus, a CA, particularly one that issued the user's private key, can check a database to verify the claimed identity.

The CA now encrypts information about the identity of the user including the public key corresponding to the private key using its own private key to form the authenticating certificate, possibly with a digital signature. A party seeking to authenticate the identity of the user decrypts the certificate with the CA's public key. Thus, advantageously the certificate also provides the party seeking to authenticate the user's identity with the user's public key.

While the user can read the information certified by the CA, the user cannot alter the information without being detected since the user does not know the CA's private key. Furthermore, the CA may attach an encrypted one-way hash of the message so that a recipient can further gain confidence that the entire message is authentic even if it is received in smaller parts. A one-way hashing function is often chosen because altering the message while retaining the same hashing result is a significantly difficult undertaking further attesting to the authenticity of the attached message. In other words, the encrypted messages can be read by many people since the decoding key is a public key, but they cannot be altered without the altered state being flagged. In addition, such an authenticating certificate and the associated keys may be provided with a finite lifetime thus making tampering and reverse engineering difficult.

Further details of key exchange, authentication and authorization requests to enable secure client-server communications are described in the attached documents in the appendix titled "IEEE 802.11 Security White Paper", "IEEE 802.1X Supported Scenarios," and "Bluetooth Security Architecture Version 1.0," which are incorporated in their entirety in the present application.

Figure 2:
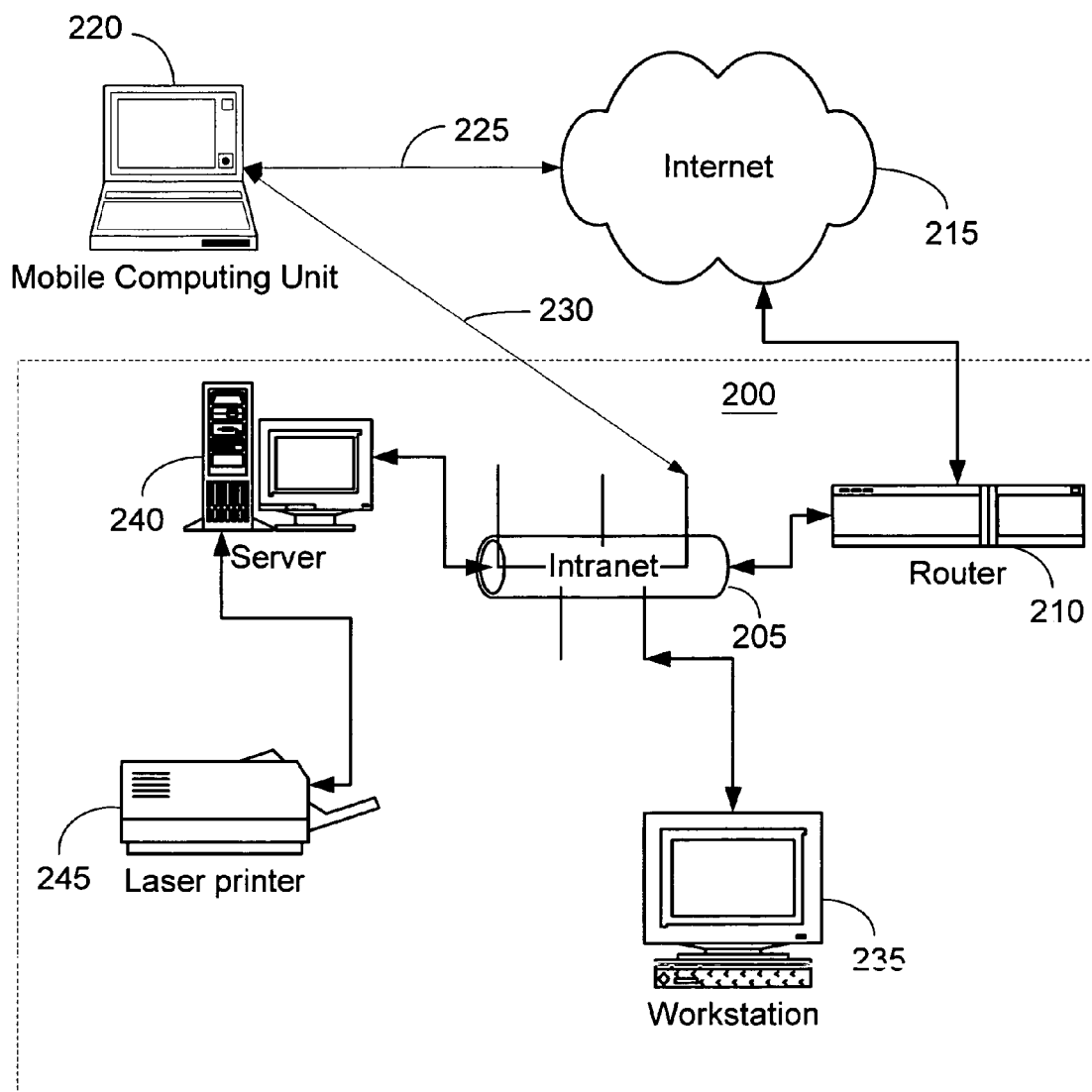
FIG. 2 is an illustration of the general computing environment in which an embodiment of the invention functions.

FIG. 2 illustrates an exemplary computing environment 200 having a set of dynamic links, a set of static links and a plurality of devices. The computing environment 200 includes an intranet 205 connected to a router 210, which, in turn, connects to the Internet 215. At least one mobile computing unit 220 connects to the Internet 215 via a dynamic link 225. Alternatively, the mobile computing unit 215 may connect to the intranet 205 using the link 230, the presence of which does not exclude the dynamic link 225. The mobile computing unit 220 need not be a computer, but instead may be any mobile computing device such as a cellular communications capable device, or an audio/video content providing device with access to online content and the like. The plurality of devices in the computing environment 200 includes a workstation 235, a server 240 and a printer 245 controlled by the server 240. The static links refer to the linkages defining the intranet 205 while the dynamic links refer to linkages that exhibit a high likelihood of failure, such as the link 225 or the link 230 between the mobile computing unit 220 and the Internet 215 or the intranet 205 respectively.

Ensuring a static link's security is easier than providing a secure dynamic link. Security for dynamic links is more difficult to implement due to the transient nature of the dynamic link and the greater latency and bandwidth restrictions on such links. Moreover, due to the mobile nature of portable computing devices such as computing unit 220, there is a need to guard against unauthorized network access.

A strategy of extending secure links to trusted users and trusted machines related by transitive trust relationships achieves a secure computing environment without the need to centrally manage all secure relationships. Explicit trust relationships enable security breaches to be traced. Moreover, explicit trust relationships facilitate manageable authentication procedures while retaining low latency in establishing secure connections.

Restricting access to trusted users and trusted machines, where machines may be implemented in software or hardware, is advantageous since it allows only trusted machines to access the network without an authenticated user to access the network while allowing trusted users to use any machine for accessing the network. Users and macnines without acceptable authentication are prevented from acquiring unauthorized access by this strategy. On the other hand, permitting machine-based authentication allows a machine with valid credentials standard levels of access for a user with valid credentials. A user without valid credentials obtains limited authorized access on a machine without valid credentials. Such access permits non-authenticated users a basic level of access. Such users may be visitors, new or former employees and the like who need some access to a secure network. Trusted users may access network resources via either trusted or non-trusted machines connected to the network.

Providing a limited form of access to new users or users who have misplaced passwords or otherwise failed to properly log on makes their computing experience smoother and less intimidating. Similarly, allowing sufficient access enabling new users and employees to directly interact with a system administrator decentralizes the process of adding and removing users while retaining centralized control. Decentralization exists in the sense that the new employee need not physically go to a central location to receive authorization to access restricted computing resources. The access limits placed on non-authenticated users are tailored to avoid compromising network resource security. To this end the same user has different authorizations to better reflect the relative security risks associated with the circumstances under which the user logs on. For example, a user accessing computing resources from a remote site may have more limited privileges than a user using a machine within a building housing intranet 205 or a user using a trusted machine. Thus, the disclosed method and system allow users with mobile computing units access to a computing environment with varied levels of access, i.e., authorization, depending on the identity of the mobile computing unit and/or the context under which access is requested.

Figure 3:
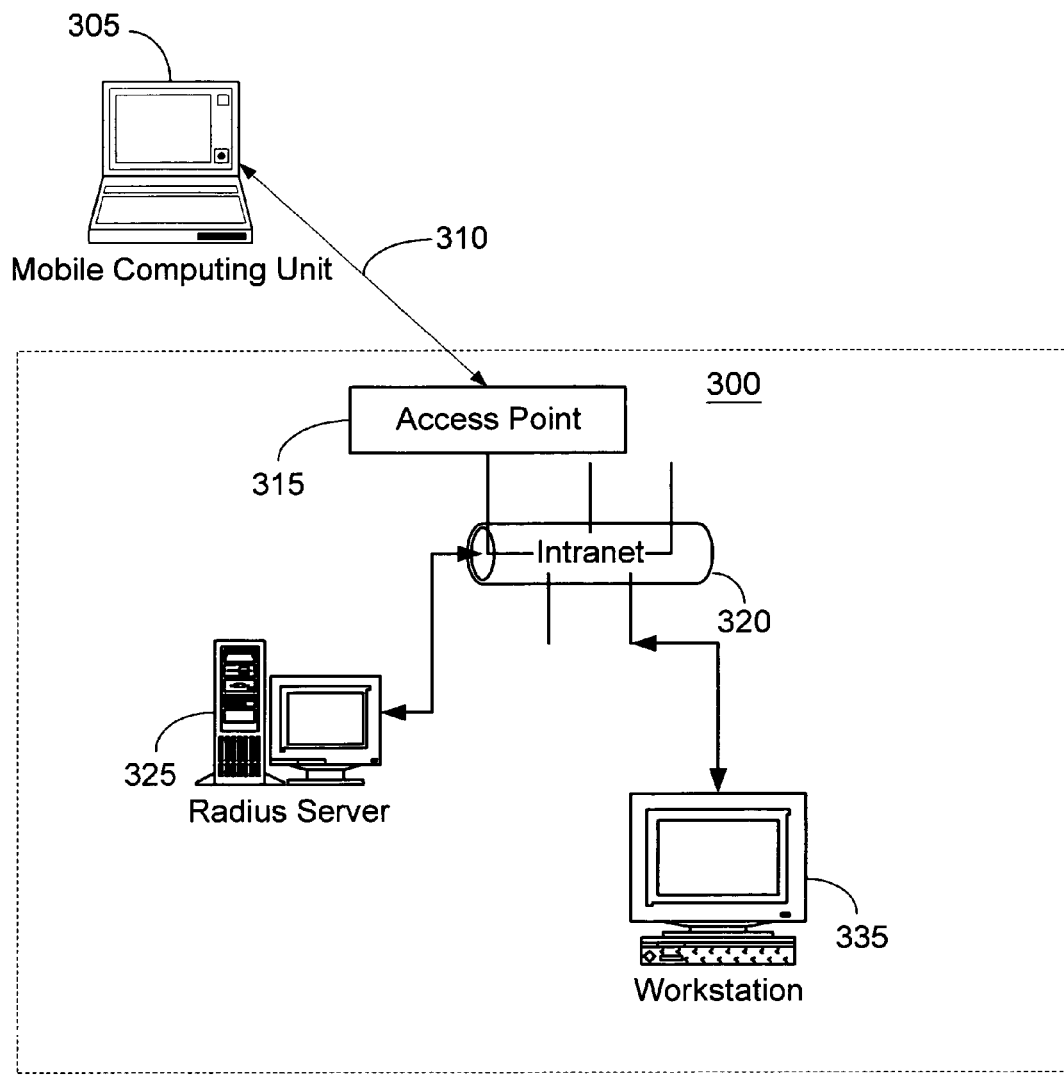
FIG. 3 illustrates another computing environment suitable for wireless links between an access point in a secure network and a mobile computing unit.

FIG. 3 illustrates a computing environment 300 suitable for supporting wireless links. A mobile computing unit 305 can associate with the computing environment 300 via a link 310 having an access point 315. Access point 315 serves as an authenticator for the mobile computing unit 305 to grant access to computing resources in the computing environment 300. Access point 315 forwards asserted identities and certificates to authenticate asserted identities received from the mobile computing unit 305 to a Remote Authentication Dial-In User Service ("radius") server 325. The radius server 325 forwards requests for identity and proof of identity to the access point 315 for further forwarding to the mobile computing unit 305 to prevent any direct communication between the radius server 325 and a non-authenticated mobile computing unit 305.

Figure 4:
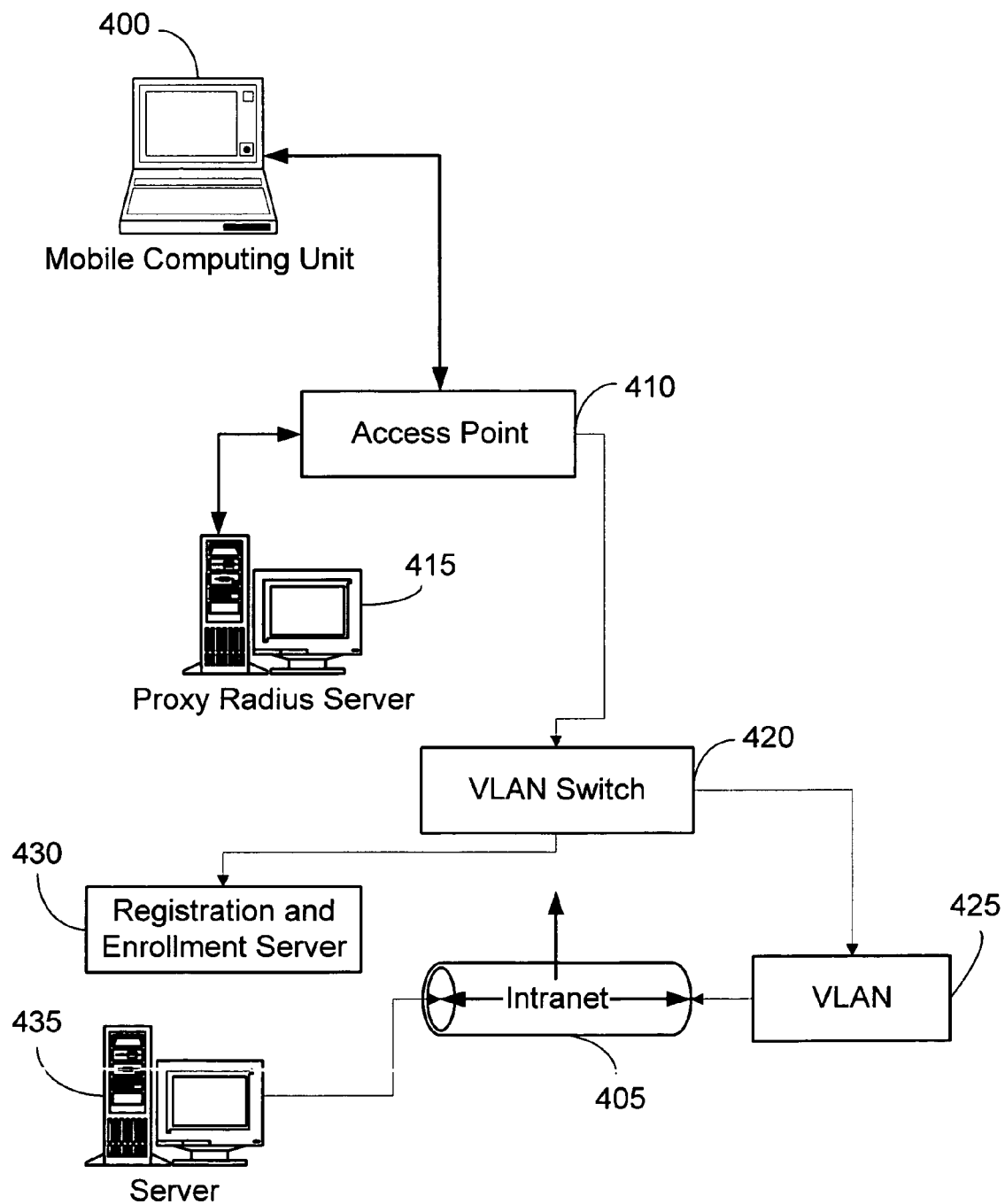
FIG. 4 illustrates a computing environment supporting remote access by a mobile computing unit with authentication via a remote proxy radius server that is trusted, or at least known to the secure network being accessed by the mobile computing unit.

FIG. 4 illustrates a mobile computing unit 400 attempting access to an intranet 405 from a remote site. The mobile computing unit 400 associates with a remote access point 410, which acts as an authenticator and uses a proxy radius server 415 to authenticate the mobile computing unit 400. Following successful authentication the access point 410 forwards packets directed to the network to a VLAN switch 420. The VLAN switch 420 consults a registration and enrollment server 430 to determine if the mobile computing unit 400 is permitted to remotely access the VLAN 425 connected to the intranet 405. In case of a duly registered mobile computing unit 400, communications directed to the VLAN 425 or to a server 435 connected via the intranet 405 are forwarded appropriately. If authentication fails then packets are blocked from further propagation to the VLAN 425, or server 435.

In accordance with the invention there are two possible logon states for a user and machine respectively: user with valid credentials; user without valid credentials; machine with valid credentials; and machine without valid credentials. The machine and user logon states together generate four possible logon states. The invention includes embodiments exhibiting a preference for one of the possible logon states over another of the possible logon states.

Figure 5:
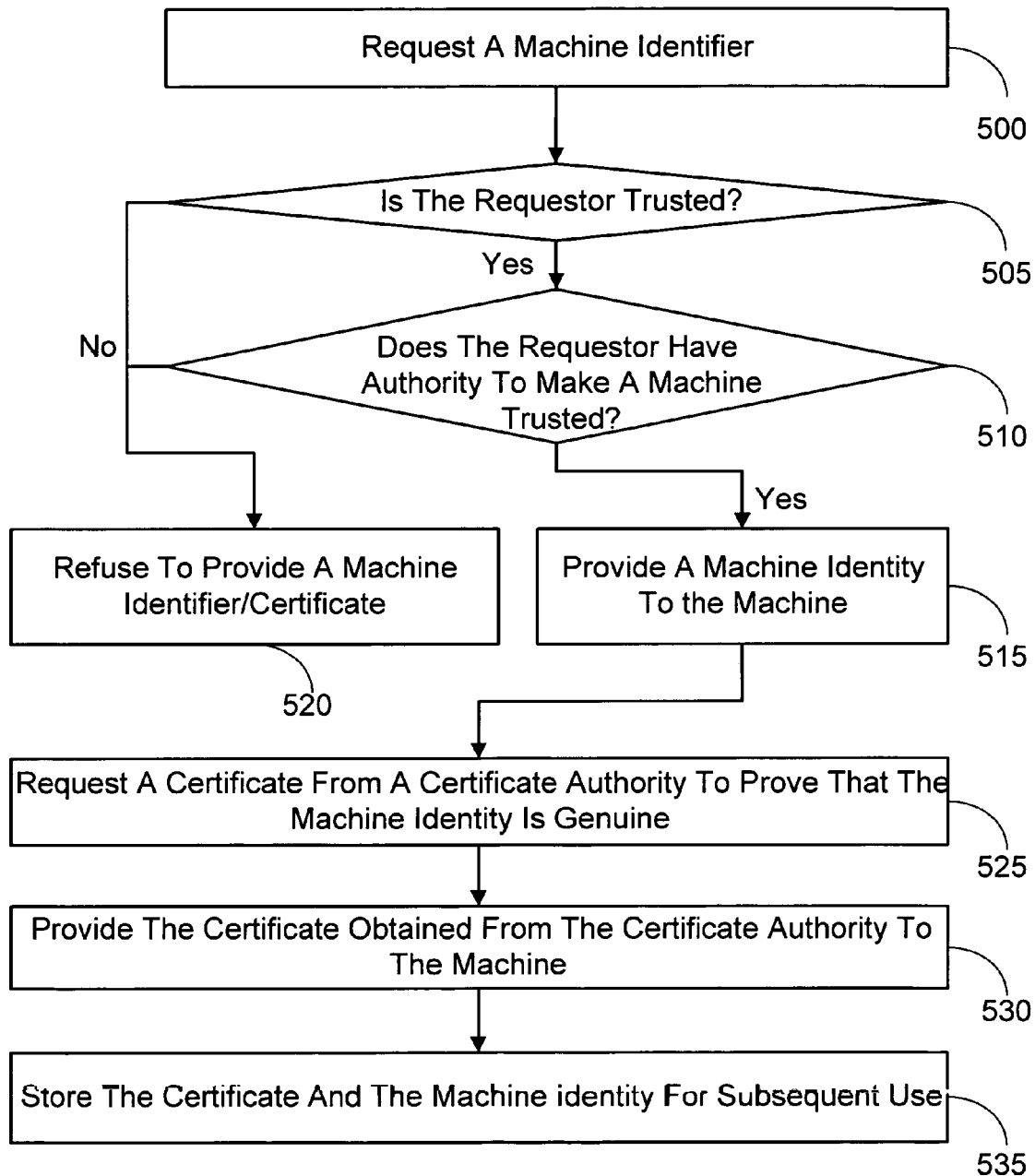
FIG. 5 is a flow diagram illustrating the steps for a trusted user to obtain a machine identity for a machine.

In an embodiment of the invention, if a user is unable to provide an authenticated identity, the machine used by the user can provide an identity to allow a machine-based log-in procedure to provide limited access. FIG. 5, which should not be construed to limit the variations on the steps, illustrates a possible set of steps for allowing a trusted machine to log-in using its' machine identity. To this end, a trusted user initially establishes the trusted status of the machine. Step 500 of FIG. 5 shows a trusted user requesting a machine identity for the machine being used by the user. The network server, for example a domain controller, determines whether the user is trusted during step 505 and authorized at step 510 to make such a request. If the user is authorized to make the request then the network server provides unique machine identification (step 515). Otherwise at step 520 the network server refuses the request. At step 525 the network server requests a CA to provide a certificate to prove the identity of the machine and during step 530 forwards the certificate to the machine. In step 535 the machine identifier and certificate are advantageously stored on the machine for subsequent use.

Figure 6:
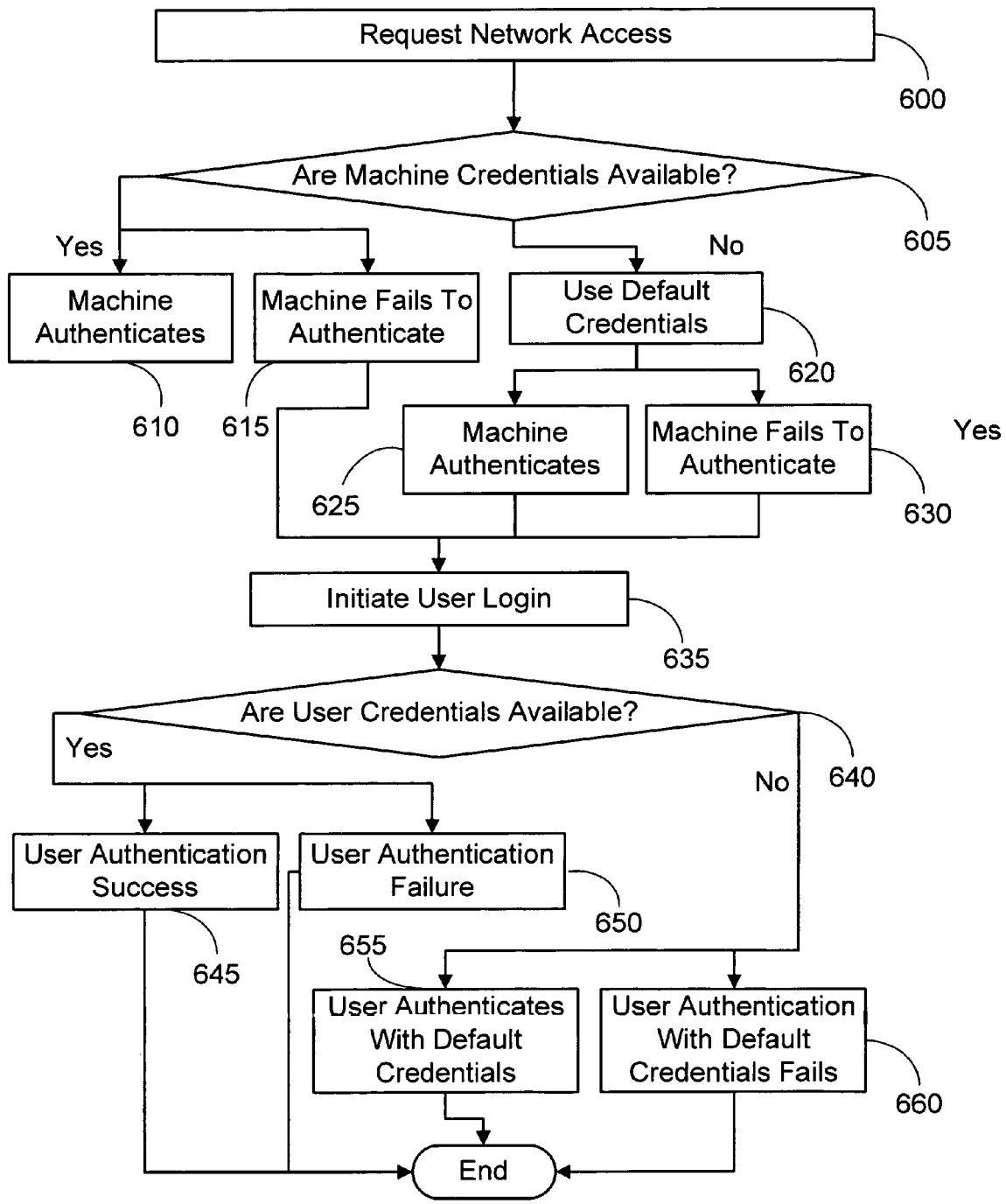
FIG. 6 is a flow diagram illustrating the steps for a trusted machine logging on along with the use of a default user identifier to initiate the logon, with system administrator intervention, by a machine or user without proper credentials.

In an embodiment of the invention illustrated in FIG. 6, machine authentication and user authentication are carried out either with the use of acceptable credentials or with the use of a default user ID to allow system administrator intervention in machine or user authentication. Step 600 includes a request to access the network. If machine credentials are available then control passes from step 605 to step 610 and the machine authenticates. Although in this embodiment the user cannot also authenticate on the same machine this should not be interpreted to be a limitation on the scope of the invention. Step 610 is particularly useful for starting servers on a network without requiring that a user be logged on at the same time. Moreover some such machines in privileged locations may not even provide a user interface. If the machine fails to authenticate the control transfers to step 615. On the other hand, if the machine does not have credentials then control transfers to step 620 from step 605. Step 620 includes the machine using a default user identifier to initiate machine authentication, which is successful in step 625 or fails in step 630. The control from steps 620, 625 and 630 passes to step 635. Step 635 includes instructions to initiate user log-in. If user credentials are available then the user causes the control to transfer to step 645 to indicate successful user authentication and termination of the procedure. On the other hand, if the user credentials are unacceptable then user authentication fails in step 650 followed by termination of the procedure. In the event user credentials are not available in step 640 user causes the control to be transferred to step 655 by the successful use of the default user identifier. Failure to authenticate using default user identifier results in control passing to step 660 and eventual end of the authentication procedure.

An exemplary embodiment in an Extensible Authentication Protocol ("EAP") compatible environment includes an EAP start message. Of course, in other environments other start messages could be employed, for example, with a view to reduce the total number of messages employed to carry out the initial transactions.

Figure 7:
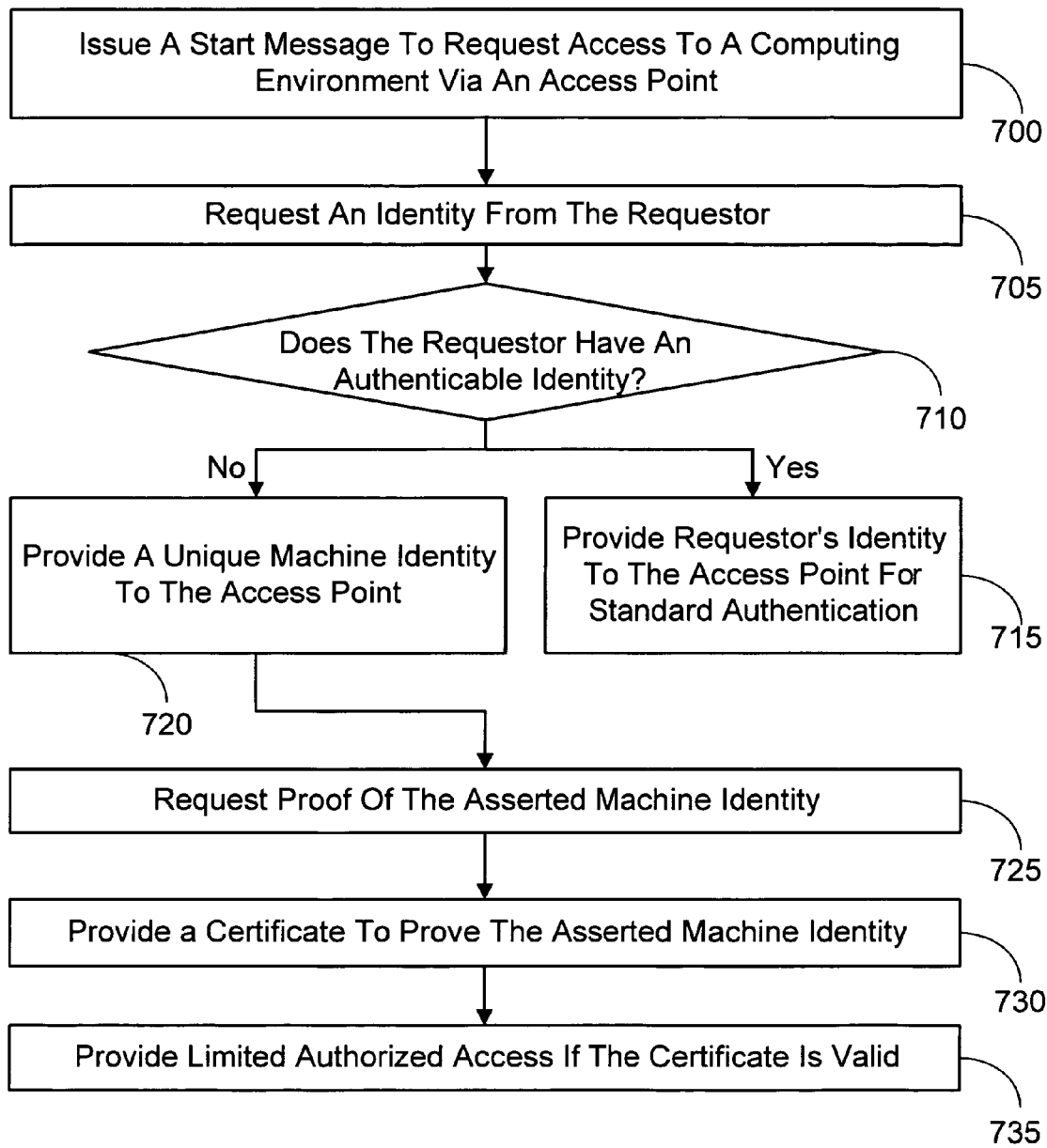
FIG. 7 is a flow diagram summarizing steps for obtaining access to computing resources in a secure network using a machine identity.

An embodiment of an authentication procedure on a trusted machine is illustrated in FIG. 7. During step 700 a user issues a start message to express interest in accessing a computing environment. A wireless access point receives the start message for establishing a wireless link. The wireless access point is configured to not forward data traffic to either the underlying wired network or another wireless mobile computing device from an unauthenticated connection. The access point acting as an authenticator provides limited interaction to authenticate the requester prior to establishing a suitable link. To this end, at step 705 the access point requests the identity of the requester to initiate the authentication procedure if such identity is lacking, e.g., in the start message. In response to this request, in step 710 the requester provides an authenticable identity if one is available. This determination consists of a time-out period. Alternatively, the requester explicitly indicates the inability to provide the requested identity.

If the requested identity is available, then standard authentication procedures are performed in step 715. In the standard procedure the access point forwards the asserted identity to a radius server. The radius server transmits a challenge to the access point, which in turn forwards it to the mobile computing unit. The mobile computing unit and the radius server cannot directly communicate with each other to ensure security of the network resources. However, if a valid identity is not provided then the trusted machine provides a machine identity at step 720. The access point forwards the trusted machine identity to the radius server, which, in turn, provides a challenge to be forwarded by the access point to the mobile computing unit.

During step 725, the access point challenges the asserted identity by requesting proof of the asserted identity in accordance with the challenge provided by the radius server. The mobile computing unit submits a certificate to the access point to prove the asserted machine identity in step 730. In step 735 the access point provides limited access commensurate with the asserted and authenticated machine identity if the certificate is valid.

Figure 8:
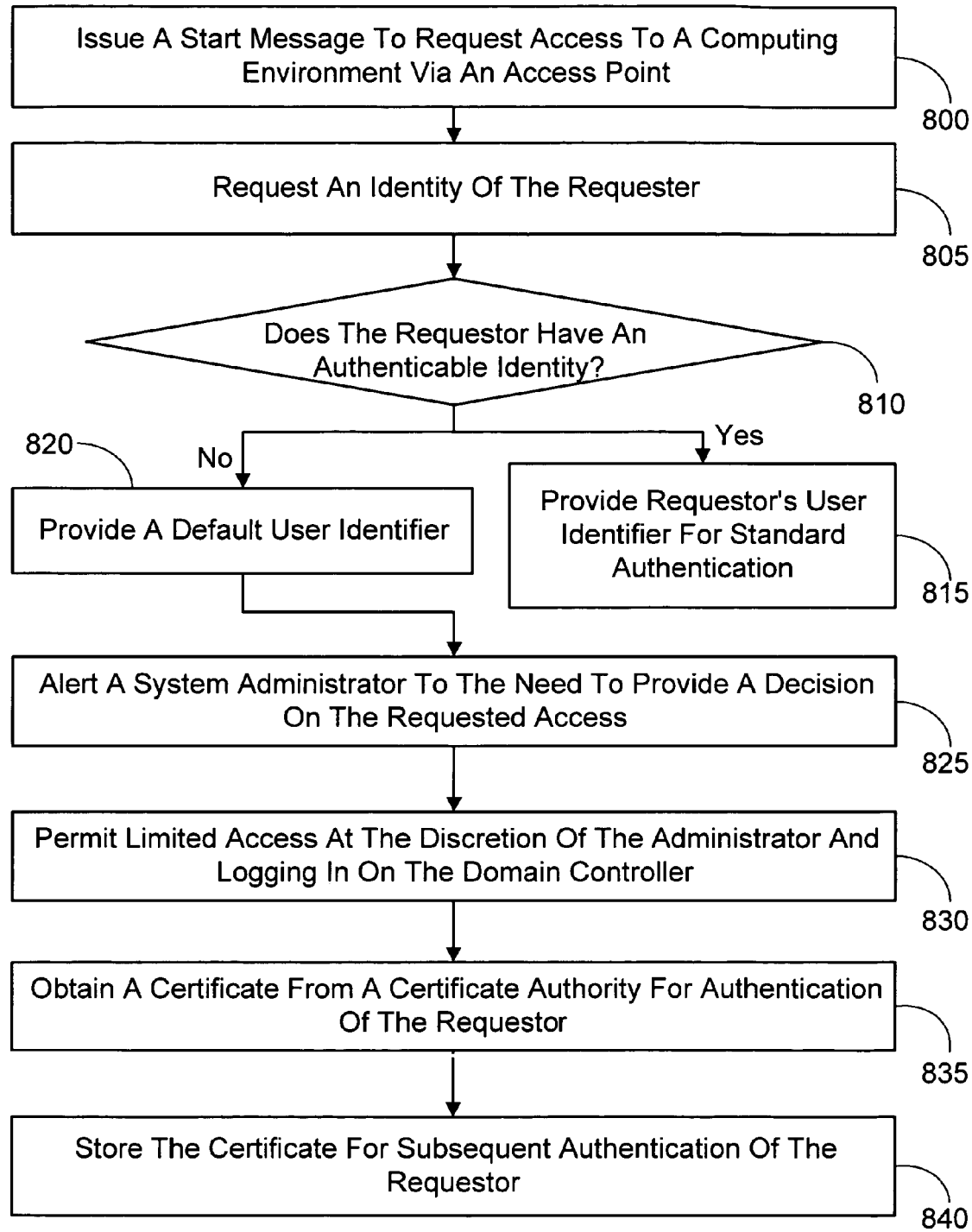
FIG. 8 is a flow diagram summarizing steps for using a default user identifier to invoke a system administrator to enable a user without satisfactory authentication information to access the network without physically visiting a centralized facility.

FIG. 8 illustrates a method for using a default user identity to invoke intervention by a system administrator. This method is useful in authenticating and enrolling new users without requiring them to physically access a centralized facility. Following a start message to request access to a computing environment during step 800, a request is made for an assertion of an identity during step 805. The user provides a default user identification, which may be a blank string, in step 810. In response to the receipt of the default user identifier the system does not deny all access to the user and instead invokes a system administrator who decides whether to allow the user access to the computing environment and the level of authorization in step 815. If the system administrator verifies the identity of the user, i.e., authenticate the user, then the domain controller permits the user to logon in step 830. The domain controller then obtains a certificate to prove the user's identity during step 835. At step 840 subsequent access to the computing resources utilizes the certificate to prove the user's identity without the need to invoke the system administrator.

Figure 9:
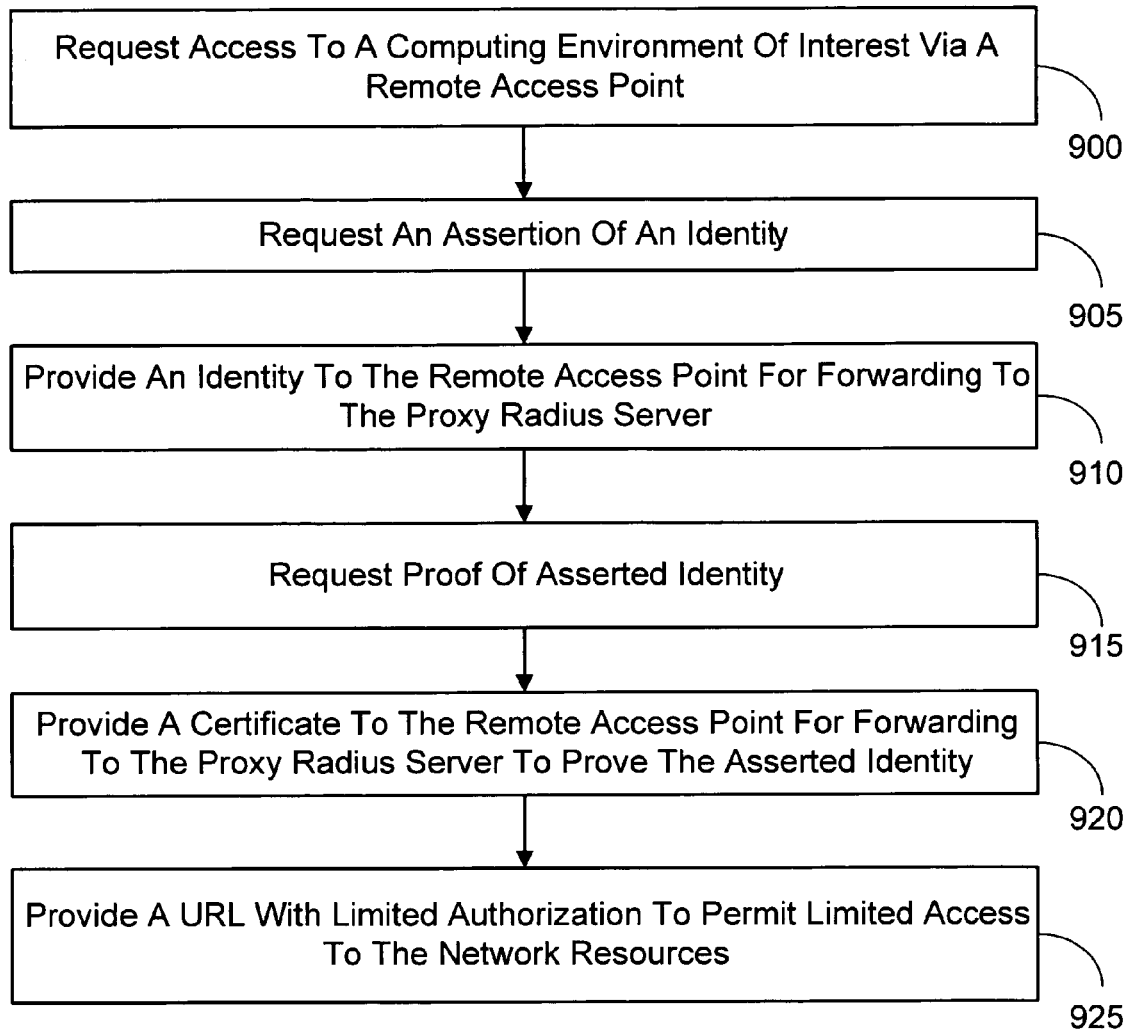
FIG. 9 is a flow diagram summarizing a set of steps for a remote mobile computing unit obtaining access to a secure network via a proxy radius server.

FIG. 9 illustrates an exemplary method for providing limited access to a user in a remote and non-secure site, which may be defined as requiring the use of one or more machines whose identity is unknown or a physical location that is outside of the intranet. In such a scenario it is advantageous to provide limited access that does not reflect all of the privileges the particular user may have had if operating from a secure site or machine. In step 900 a request for access is made to a remote access point at via a proxy server followed by the customary request for an assertion of an identity in step 905. Providing an identity, which may be a user or machine identity, during step 910 results in a challenge during step 915 to prove the asserted identity. Step 920 includes the requester proving the asserted identity by providing a certificate from a trusted certificate authority. The radius proxy server forwards the relevant transactions and the radius server charged with policing the security provides a Universal Resource Locator ("URL") to the user, in effect a port address, to allow access to the computing environment at step 925. This URL typically provides a lesser degree of access to network resources by the user than the user would receive via an access point in the network.

Figure 10:
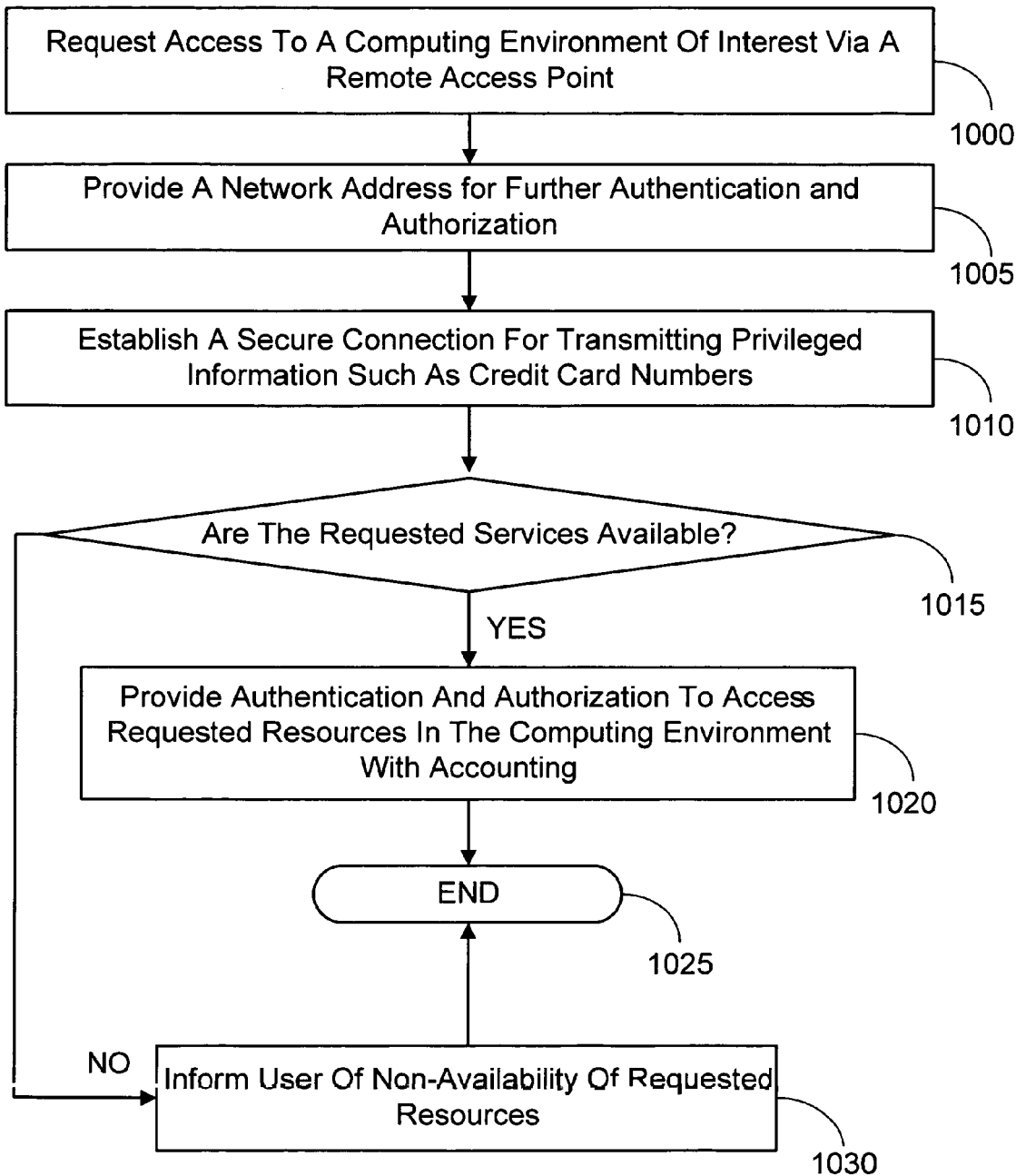
FIG. 10 is a flow diagram summarizing a set of steps for authentication of a remote user who is seeking access to resources on a secure network.

FIG. 10 summarizes steps in another embodiment of the invention for remote access to a secure computing resource. Step 1000 includes a request by a remote user to access a resource in a secure computing environment. This request may be made at an access point in another network and over the Internet. A RADIUS server handles the request and provides a URL in step 1005 to permit the requester to authenticate at the distant site. This connection is likely to be a secure connection, as is indicated in step 1010, and may use SSL and other similar technologies to authenticate the requester. In addition, the web page used for authentication may also request and accept information for accounting purposes. Such information includes credit card numbers, the time and nature of resources requested and the like. At step 1015 a determination is made if the requested services are available. If the services are available an the authentication is carried out satisfactorily then in step 1020 authorization is provided to access the requested resources followed by the termination of the procedure. On the other hand if the requested resources are not available then the control passes from step 1015 to step 1030 to inform the requester that the resource or access is not available followed by termination at step 1025.

The methods described above allow automated management of a plurality of users, some of which have mobile computing units, in a network having dynamic links by permitting both machine and user based authentication combined with various levels of authorizations reflecting the relative security risks for the different users and links.

The secure link established by the methods described herein includes encryption. Encryption is enabled by the exchange of at least one key and the generation of additional keys by the access point and the mobile computing unit to make the communications secure. These keys may be symmetric or asymmetric. Such encryption includes frequent key changes to improve the security. Furthermore, in the event the secure link is disrupted and then reestablished at a new access point, which is connected to the earlier used access point, the mobile computing unit merely presents the identity of the earlier used access point and asserts its identity. The new access point confirms the previous authentication of the mobile computing unit and allows access without the need to re-authenticate the mobile computing unit. This strategy, combined with a time out, allows for a better computing experience by reducing the latency due to the time taken in authenticating a new mobile unit.

In view of the many possible embodiments to which the principles of this invention may be applied, it should be recognized that the embodiment described herein with respect to the drawing figures is meant to be illustrative only and should not be taken as limiting the scope of invention. For example, those of ordinary skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

All of the references cited herein, including patents, patent applications, and publications, are hereby incorporated in their entireties by reference.

We claim:

1. A method of providing a mobile computing unit with privileged access to a computing resource, the method comprising the steps of:
    detecting a failure of a user of the mobile computing unit to complete a logon to access the computing resource because the user has not submitted sufficient identifying information;
    obtaining credentials with a unique machine identifier to facilitate authenticating an identity of the mobile computing unit;
    providing the credentials to an authenticator to prove the machine identity, the authenticator controlling access to the computing resource; and
    establishing limited access to the computing resource using authorization information obtained from the authenticator that reflects a relative security level for a user of the mobile computing unit, the authorization information corresponding to the authenticated identity of the mobile computing unit.

2. The method of claim 1 wherein the mobile computing unit communicates with the computing resource using at least one wireless link.

3. The method of claim 1 wherein the authorization information includes a key for encrypting communications from the mobile computing unit to an input port.

4. The method of claim 3 wherein the key is a symmetric session key.

5. The method of claim 1 further comprising the step of storing the unique machine identifier on the mobile computing unit for subsequent use.

6. The method of claim 1 further comprising the step of storing the certificate on the mobile computing unit.

7. The method of claim 1 further comprising the step of receiving the unique machine identifier.

8. A computer-readable medium having computer executable instructions for performing the steps of a method of providing a mobile computing unit with privileged access to a computing resource, the method comprising the steps of:
- denying the mobile computing unit access to the computing resource for failure of a user of the mobile computing unit to complete a log-in to gain unlimited access to the computing resource because the user has not submitted sufficient identifying information;
- obtaining credentials with a unique machine identifier to facilitate authenticating an identity of the mobile computing unit;
- providing the credentials to an authenticator to prove the machine identity, the authenticator controlling access to the computing resource; and
- establishing limited access to the computing resource using authorization information obtained from the authenticator to reflect a relative security level for a user of the mobile computing unit, the authorization information corresponding to the authenticated identity of the mobile computing unit.

9. A computer-readable medium as in claim 8 having computer executable instructions wherein the mobile computing unit communicates with the computing resource using at least one wireless link.

10. A computer-readable medium as in claim 8 having computer executable instructions wherein the authorization information includes a key for encrypting communications from the mobile computing unit to an input port.

11. A computer-readable medium as in claim 8, having computer executable instructions for performing the additional step of storing the unique machine identifier on the mobile computing unit for subsequent use.

12. A computer-readable medium as in claim 8, having computer executable instructions for performing the additional step of storing the certificate on the mobile computing unit.

* * * * *